G. J. VON HAGEL.
NUT LOCK.
APPLICATION FILED JAN. 10, 1911.

993,918.

Patented May 30, 1911.

Inventor
Gert J. Von Hagel.

Witnesses
William Smith

By Victor J. Evans
Attorney

UNITED STATES PATENT OFFICE.

GERT J. VON HAGEL, OF AKRON, IOWA.

NUT-LOCK.

993,918.  Specification of Letters Patent.  Patented May 30, 1911.

Application filed January 10, 1911. Serial No. 601,803.

*To all whom it may concern:*

Be it known that I, GERT J. VON HAGEL, a citizen of the United States, residing at Akron, in the county of Plymouth and State of Iowa, have invented new and useful Improvements in Nut-Locks, of which the following is a specification.

This invention relates to nut locks and the object of the invention is the provision of a simple and efficient clip which may be readily applied to a bolt and nut and may be thrown into and out of operative position with ease so that the nut may be tightened at any time to take up slack in the parts which it is holding.

Further objects of the invention will appear as the following specific description is read in connection with the accompanying drawing, which forms a part of this application, and in which:—

Figure 1:
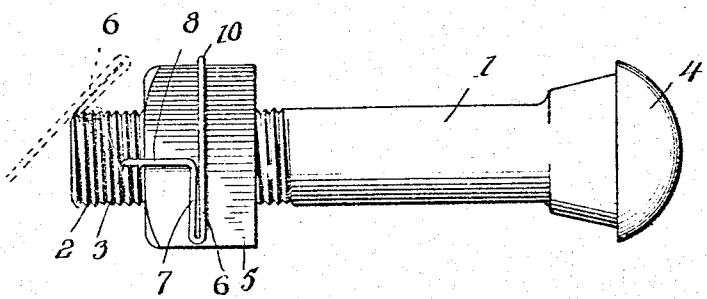
Figure 2:
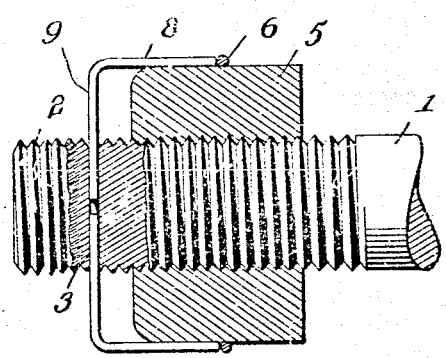
Figure 3:
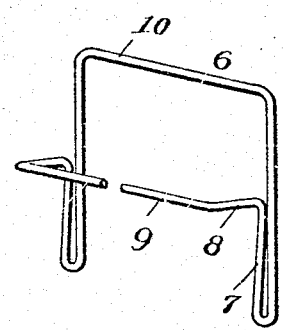

Figure 1 is a side elevation of a bolt showing my improved nut lock thereon and showing the same in dotted lines in inoperative position. Fig. 2 is a detail vertical section. Fig. 3 is a detail perspective view of the clip removed from the nut.

Referring more particularly to the drawing, 1 represents a bolt which is exteriorly threaded at one end, as at 2. In the threaded portion a transverse aperture 3 is formed. The opposite end of the bolt is provided with the usual head 4.

A nut 5 is shown as threaded upon the bolt 1 and the nut lock comprises a single integral strand of spring wire 6 whose separate legs are bent back upon themselves, as at 7, so as to lie parallel with the main portions thereof and in the same vertical plane. The outer ends of these bent back portions are bent upwardly, as at 8, and bent laterally, as at 9, to form entering points which are adapted to project into the hole 3 so as to prevent the nut lock from turning with the nut and at the same time forming a fulcrum shaft upon which the nut lock may turn.

The legs of the nut lock are shown as connected together by what will be termed a yoke-piece 10 which is adapted to lie, when the lock nut is in operative position, against one side of the nut, the connected legs lying on opposite adjoining sides.

When it is desired to tighten the nut upon the bolt the yoke member 10 is raised until the legs of the device are freed from the sides of the nut, the device pivoting upon the inwardly turned portions 9 journaled in the hole 3. After the nut has been tightened to the required degree and is positioned so as to aline with the sides of the nut lock, the legs are sprung apart and the yoke member moved downward into engagement with the nut where it is held by the inherent resiliency of the device.

Having thus described the invention, what I claim as new is:—

1. In combination, a transversely apertured bolt, a nut thereon, a substantially U-shaped spring clip engaged with the sides of the nut and journaling legs formed on the ends of the clip and entering the aperture from opposite sides of the bolt.

2. In combination, a transversely apertured bolt, a nut thereon, and a substantially yoke-shaped spring clip having its ends extending into the transverse aperture from the opposite sides, said clip having inherent resiliency to clamp the sides of the nut when in operative position and to be swung out of engagement with the nut, whereby the nut may be tightened without removing the clip from the bolt.

In testimony whereof I affix my signature in presence of two witnesses.

GERT J. VON HAGEL.

Witnesses:
E. H. YOUNGSTROM,
C. G. BRADY.